United States Patent [19]

Zabrocki et al.

[11] 4,331,573

[45] May 25, 1982

[54] AQUEOUS DISPERSIONS OF URETHANE-MODIFIED POLYESTERS, A PROCESS FOR THEIR PRODUCTION AND THEIR USE FOR THE PRODUCTION OF LACQUERS

[75] Inventors: Karl Zabrocki, Büttgen; Ludwig Bottenbruch, Krefeld; Franz Weider, Leverkusen, all of Fed. Rep. of Germany

[73] Assignee: Bayer Aktiengesellschaft, Leverkusen, Fed. Rep. of Germany

[21] Appl. No.: 167,203

[22] Filed: Jul. 9, 1980

[30] Foreign Application Priority Data

Jul. 14, 1979 [DE] Fed. Rep. of Germany ....... 2928552

[51] Int. Cl.³ .............................................. C08L 91/00
[52] U.S. Cl. .................................... 524/199; 524/591; 524/375; C08L/75/06
[58] Field of Search ................... 260/29.2 TN, 29.2 E, 260/22 TN, 18 PT, 18 TN; 525/440

[56] References Cited

U.S. PATENT DOCUMENTS

| | | | |
|---|---|---|---|
| 3,461,103 | 8/1969 | Keberle et al. | 260/75 |
| 3,607,800 | 9/1971 | Sekmakas | 260/18 PT |
| 3,639,315 | 2/1972 | Rodriguez | 260/29.2 TN |
| 4,028,313 | 6/1977 | Müller et al. | 260/77.5 AP |
| 4,208,311 | 6/1980 | Kinoshita et al. | 260/29.2 TN |

FOREIGN PATENT DOCUMENTS 1524276 9/1978 United Kingdom .

*Primary Examiner*—Theodore E. Pertilla
*Attorney, Agent, or Firm*—Connolly and Hutz

[57] ABSTRACT

Melts of Urethane-modified oligoesters and 1 or polyesters can easily be dispersed in an aqueous phase in the presence of a dispersing agent combination comprising a polyether-modified polyester and a non-ionic dispersing agent having a particular HLB value.

8 Claims, No Drawings

AQUEOUS DISPERSIONS OF URETHANE-MODIFIED POLYESTERS, A PROCESS FOR THEIR PRODUCTION AND THEIR USE FOR THE PRODUCTION OF LACQUERS

This invention relates to aqueous dispersions of urethane-modified polyesters, to a process for their production and to their use for the production of lacquers.

In the context of the invention, "aqueous dispersions" are understood to be heterogeneous systems which are opaque and in which the organic resin phase is dispersed in water in the form of particles having an average size of from 50 to 5000 nm. Accordingly, the expression "aqueous dispersions" as used hereinafter does not include those solutions of urethane-modified polyesters which are homogeneously dispersed in the aqueous phase by neutralised acid groups and which form transparent solutions. Resins of this type generally have acid numbers of more than 40, are pre-dissolved in water-miscible organic solvents and, after neutralisation, are diluted with water to form homogeneous, transparent solutions.

There are in the main two reasons for the increasing use of aqueous dispersions of lacquer binders: firstly, they have the advantage that there is no need to use organic solvents and, secondly, they have hardly any tendency to run down vertical surfaces in contrast to the coating compositions applied from organic solution (cf. F. Armitage, L. G. Trade, J. Oil and Colour Chemists Assoc. 1957, page 860).

It is already known that urethane-modified polyesters can be produced in aqueous dispersion and used as coating compositions (D. Dieterich, H. Reiff, Adv. in Urethane Science and Technology 4 (1976), 112–131). In this particularly simple melt dispersion process, anionic or cationic groups are attached to the polymer chain of polyester urethanes by the processes described in this literature reference, after which these polyester urethanes are dispersed in the water phase with salt formation. Anionic systems have proved to be better in practice by virtue of their greater stability with respect to electrolytes, dyes, etc. (A. P. Grekov, Sint. Fiz. Khim. polimerov 21 (1977), 48–55).

According to D. Dieterich and H. Reiff, anionic dispersible polyester urethanes may be produced by incorporating anionic polyfunctional substances containing groups capable of salt formation, for example tricarboxylic and tetracarboxylic acids, carboxyl-modified oligomers or diaminosulphonic acids, into the polymer chain during the isocyanate polyaddition reaction. This reaction step involves a real danger of secondary reactions which lead to foam formation and to partially crosslinked and, hence, unusable products. Accordingly, the reaction is difficult to control, particularly where large batches are involved. In addition, these reactions can in general only be carried out in solvents.

On account of the composition of the starting materials the polyurethane ionomers described by D. Dieterich and H. Reiff contain a certain proportion of urea groups and groups capable of salt formation which inevitably jeopardise the resistance to water and weather of coatings produced therefrom.

As mentioned by the authors, the large number of polar groups leads to intermolecular interaction and pseudo-gel formation of the polyurethanes (before dispersion).

According to German Auslegeschrift No. 1,237,306, these difficulties are avoided by producing anionic polyester urethanes from high molecular weight, linear, preferably aliphatic polyester urethanes which are reacted with cyclic compounds producing salt-forming groups. In this way, it is possible to disperse polyester urethanes having molecular weights of from 5000 to 2,000,000 in the aqueous phase to form products which are also suitable for the production of coatings. Linear aliphatic polyester urethanes used as coatings have the disadvantage of inadequate hardness and inadequate resistance to solvents. If branched and/or aromatic oligoesters and polyesters, of the type known as a basis for binders in the lacquer field, are used as the starting polymer for producing the polyester urethanes, the polyester urethanes produced in this way are so highly viscous that they can no longer be directly dispersed from the melt, but only after addition of relatively large quantities of solvent.

The present invention provides aqueous dispersions of urethane-modified polyesters which are characterised in that they consist of I. from 25 to 60% by weight of urethane-modified oligoesters and/or polyesters having molecular weights of less than 5000, preferably less than 4000, and acid numbers of from 10 to 40, preferably from 10 to 30, and containing less than 1% by weight, preferably less than 0.1% by weight and, more particularly, less than 0.01% by weight, based on I, of urea groups, the substances I being obtainable by reacting urethane-modified oligoesters and/or polyesters having acid numbers below 10 and OH numbers of from 30 to 500, preferably from 50 to 280, with dicarboxylic acid anhydrides and/or tricarboxylic acid anhydrides, (IIa) from 0.02 to 4% by weight of a non-ionic emulsifier having a calculated HLB value (as herein defined) of from 10 to 20 and preferably corresponding to the following formula:

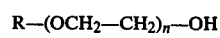

in which

R is an alkyl radical containing from 12 to 20 carbon atoms, or

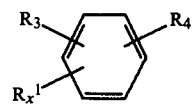

$R^1$ is an alkyl radical containing from 4 to 20 carbon atoms, or

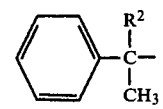

$R^2$ is a hydrogen atom, a methyl or phenyl radical,
$R^3$ is a methyl group, a phenyl radical or a hydrogen atom,
$R^4$ is a methyl group or a hydrogen atom,
n is a number of from 10 to 40, preferably from 15 to 25, and
x is a number of from 1 to 3.5, preferably from 1 to 3.0, (IIb) from 0.02 to 4% by weight of at least one polyether-modified polyester emulsifier resin containing from 10 to 50% by weight and preferably from 10 to 20% by weight, based on emulsifier resin IIb, of co-condensed polyalkylene glycol residues, preferably attached to the polyester emulsifier resin molecule by urethane groups, and III. from 32 to 75% by weight of aqueous phase containing from 30 to 150% of the quantity of alkali, ammonia or amine sufficient for completely neutralising the carboxyl groups in polyesters I and IIb,
the percentages of components I, IIa, IIb and III being based on the sum of components I to III.

It was surprising to find that it was possible to produce dispersions according to the invention which, on the one hand, may be dispersed from the melt despite branchings of the oligoester or polyester resin and which, on the other hand, may simltaneously be processed to form coatings of outstanding quality despite their relatively low molecular weight. The dispersions according to the invention are surprisingly distinguished by small particle sizes of the dispersed phase and by high stability in storage. The coatings obtainable from them show an excellent hardness/elasticity ratio, high gloss and good adhesion.

The urethane-modified polyesters to be dispersed in accordance with the invention may be produced by reacting oligoesters and/or polyesters and polyisocyanates, after which the addition product formed is "acidified " with substances forming carboxyl groups, preferably dicarboxylic acid anhydrides. The oligoesters and polyesters, hereinafter referred to as pre-condensates, may be obtained by conventional methods from alcohols and carboxylic acids, as described for example in D. H. Solomon's book entitled "The Chemistry of Organic Film Formers", John Wiley & Sons Inc., New York, 1967, pages 75 to 101.

Alcohols preferably used for the synthesis of pre-condensates are aliphatic, cycloaliphatic, and/or araliphatic alcohols containing from 1 to 6 and preferably from 2 to 4 OH groups bound to non-aromatic C-atoms and from 1 to 24 C-atom per molecule, for example glycols, such as ethylene glycol, propylene glycol, butane diols, neopentyl glycol, trimethyl-1,3-pentane diol, hexane diols; ether alcohols, such as diethylene and triethylene glycols; ethoxylated bisphenols containing two alkylene oxide residues per molecule; per-hydrogenated bisphenols; also trimethyl ethane, trimethylol propane, trimethylol hexane, glycerol, pentaerythritol, dipentaerythritol, dimethylol cyclohexane, mannitol and sorbitol; and monohydric, chain-terminating alcohols, such as methanol, propanol, butanol, cyclohexanol, 2-ethyl hexanol and benzyl alcohol.

Particularly preferred alcohols are neopentyl glycol, trimethylol propane, dimethylol cyclohexane and per-hydrobisphenol.

The pre-condensates may contain up to 15% by weight of co-condensed monohydric alcohol residues, based on the pre-condensate.

Preferred acid components for the synthesis of the pre-condensates are aliphatic, cycloaliphatic and/or aromatic polybasic carboxylic acids, preferably dicarboxylic and tricarboxylic acids, containing from 4 to 12 carbon atoms per molecule or their esterifiable derivatives (for example anhydrides or esters), for example phthalic acid anhydride, isophthalic acid, terephthalic acid, tetrahydrophthalic and hexahydrophthalic acid anhydride, trimellitic acid anhydride, pyromellitic acid anhydride, maleic acid anhydride, fumaric acid, adipic acid, glutaric acid and succinic acid, azalaic acid, endomethylene tetrahydrophthalic acid, and also halogenated acids, such as chlorophthalic acids and hexachloroendomethylene tetrahydrophthalic acid.

The pre-condensates may consist solely of polycarboxylic acids and polyhydric alcohols. However, it is also possible to modify them by the co-condensation of monocarboxylic acids.

Preferred monocarboxylic acids for the production of the pre-condensates are aliphatic, cycloaliphatic and/or aromatic monocarboxylic acids containing from 6 to 35 C-atoms per molecule, such as benzoic acid, butyl benzoic acid, tolylic acid, hexahydrobenzoic acid, abietic acid, lactic acid and fatty acids, their mixtures and esters thereof, such as lineseed oil, soya oil, wood oil, safflower oil, castor oil, cottonseed oil, peanut oil, tall oil fatty acid, lineseed oil fatty acid, soya oil, wood oil, safflower oil and recinene fatty acid and products obtained from natural unsaturated oils or fatty acids by conjugation or isomerisation: preferred saturated fatty acids are, for example, coconut oil fatty acids, $\alpha$-ethyl hexanoic acid, isononanoic acid and linear $C_{16}$–$C_{18}$ monocarboxylic acids.

According to the invention, oil-modified precondensates of the same starting materials as alkyd resins lead to coating compositions of particularly high filling power. Particularly preferred oil-modified precondensates are those having oil contents of from 20 to 50% by weight, preferably from 25 to 40% by weight, expressed as triglyceride and based on the pre-condensate.

Oil contents of from 0 to 45% by weight are generally sufficient for pre-condensates for urethane-modified polyester dispersions of the type used for the production of stoving lacquers. High contents of aromatic constituents in the pre-condensates provide the lacquer coating with particular hardness, whilst high contents of aliphatic constituents in the precondensates provide it with high elasticity.

In general, pre-condensates containing from 15 to 70% by weight and preferably from 45 to 65% by weight of dry oils, based on the pre-condensate, are used for the production of air-drying lacquer binders on the basis according to the invention.

The pre-condensates may be produced in a single stage or in several stages, one of which may be for example a separate esterification step or an oil transesterification step. The molecular weight of the pre-condensate, determined as a number average, amounts to between 150 and 4500 and preferably to between 250 and 2500, as determined by vapour pressure osmometry in dioxane and acetone. In the case of differing values, the lower value is taken as the correct value.

The type and quantity of the individual starting materials to be condensed to form the pre-condensate are selected according to the required molecular weight and the field of application. The relationship between molecular weight and the quantity of starting materials are discussed in detail by U. Holfort in "Farbe und Lack" 68 (1962), pages 513 to 517 and 598 to 607.

The pre-condensates may be produced by conventional methods (cf. Methoden der Organischen Chemie (Houben-Weyl), Georg Thieme Verlag Stuttgart, 1963, Vol. 14/2, pages 1 to 5, 21 to 23 and 40 to 44, or C. R. Martens, Alkyd Resins, Reinhold Plastics Appl. Series, Reinhold Publ. Comp. 1961, pages 51 to 59). Alcohols, carboxylic acids or their derivatives and, optionally, oils are reacted by melt or azeotropic esterification, preferably in an inert atmosphere, at temperatures in the range of from 140° to 260° C. The course of the reaction may be followed, for example, by measuring the acid number and the viscosity.

The pre-condensates are esterified up to acid numbers below 10 and preferably below 4. They contain free OH-groups corresponding to OH-numbers of from 30 to 500 and preferably from 50 to 280. Pre-condensates having OH-numbers at the lower end of this range are more suitable for air-drying systems whilst pre-condensates having high OH-numbers are more suitable for stoving systems.

The OH-containing pre-condensates are reacted with polyisocyanates to form urethane-modified polyesters. Polyisocyanates suitable for use in accordance with the invention are aliphatic, cycloaliphatic, araliphatic, aromatic and heterocyclic polyisocyanates of the type described, for example, by W. Siefken in Justus Liebigs Annalen der Chemie, 562, pages 75 to 136, for example ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate, also mixtures of these isomers, 1-isocyanato-3,3,5-trimethyl-5-isocyanatomethyl cyclohexane (German Auslegeschrift No. 1,202,785, U.S. Pat. No. 3,401,190), 2,4- and 2,6-hexahydrotolylene diisocyanate and mixtures of these isomers, hexahydro-1,3- and/or 1,4-phenylene diisocyanate, perhydro-2,4'- and/or 4,4'-diphenyl methane diisocyanate, 1,3- and 1,4-phenylene diisocyanate, 2,4- and 2,6-tolylene diisocyanate and mixtures of these isomers, diphenyl methane-2,4'- and/or 4,4'-diisocyanate, naphthalylene-1,5-diisocyanate, triphenyl methane-4,4',4''-triisocyanate, perchlorinated aryl polyisocyanates of the type described, for example, in German Auslegeschrift No. 1,157,601 (U.S. Pat. No. 3,277,138), polyisocyanates containing carbodiimide groups of the type described in German Pat. No. 1,092,007 (U.S. Pat. No. 3,152,162), diisocyanates of the type described in U.S. Pat. No. 3,492,330, polyisocyanates containing isocyanurate groups of the type described, for example, in U.S. Pat. No. 3,001,973, in German Pat. Nos. 1,022,789; 1,222,067 and 1,027,394 and in German Offenlegungsschrifts Nos. 1,929,034 and 2,004,048, polyisocyanates containing urethane groups of the type described, for example, in Belgian Pat. No. 752,261 or in U.S. Pat. No. 3,394,164, polyisocyanates containing biuret groups of the type described, for example, in German Pat. No. 1,101,394 (U.S. Pat. Nos. 3,124,605 and 3,201,372) and in British Pat. No. 889,050, polyisocyanates produced by telomerisation reactions of the type described, for example, in U.S. Pat. No. 3,654,106, polyisocyanates containing ester groups of the type described, for example, in British Pat. Nos. 965,474 and 1,027,956, in U.S. Pat. No. 3,567,763 and in German Pat. No. 1,231,688, and polyisocyanates containing polymeric fatty acid residues according to U.S. Pat. No. 3,455,883.

In general, it is preferred to use the commercially readily available di-, tri- and tetra-isocyanates, for example, 2,4- and 2,6-tolylene diisocyanate and mixtures of these isomers "(TDI)", 1,6-hexamethylene diisocyanate, perhydro-2,4'- and/or -4,4'-diphenyl methane diisocyanate and 1-isocyanato-3,3,5-trimethyl-5-isocyanatomethyl cyclohexane.

Mixtures of different polyisocyanates may, of course, be used.

The three non-aromatic diisocyanates mentioned last of all are particularly preferred because they lead to substantially non-yellowing coatings.

The quantitative ratios between polyisocyanate and pre-condensate are preferably selected in such a way that (a) the content of NCO-groups in the reactants to be reacted to form component I amounts to between 0.5 and 25% by weight and preferably to between 3 and 15% by weight, based on component I, whilst at the same time (b) an average of at least one and preferably from 2 to 4 OH-groups remain free per molecule of the reaction product of the pre-condensate and the polyisocyanate.

The reaction between the pre-condensate and the polyisocyanate may be carried out by the methods normally used in the production of urethanes. The pre-condensates may be directly reacted with the polyisocyanates at room temperature or at elevated temperature in the presence or absence of a catalyst and in the presence or absence of a solvent. Suitable catalysts are, for example, benzoyl chloride or tertiary amines. Suitable solvents are, for example, esters and ketones. It is also possible to use mixtures of different individually produced precondensates, in which case OH-containing uncondensed substances, for example ethylene glycol or propylene glycol, may also be used as a component of the particular mixture.

In one preferred embodiment, the reaction is carried out in the melt at 40° to 120° C. and preferably at 50° to 90° C. in the absence of solvents and catalysts. The reaction is regarded as complete when the content of free NCO has fallen to below 0.8 and preferably to below 0.3% by weight, based on the weight of the melt.

The reaction products obtained are subsequently acidified with dicarboxylic and/or tricarboxylic acid anhydries to acid numbers of from 10 to 40 and preferably from 10 to 30, thus forming component I. This reaction is preferably carried out in the absence of a solvent in the melt at elevated temperature, for example at a temperature in the range of from 100° to 200° C. and preferably at a temperature in the range of from 120° to 160° C. It is possible in this reaction step to follow semi-ester formation with further esterification steps, i.e. further to condense the semiesters formed, preferably at temperatures in the higher range indicated, to form products of higher molecular weight. The quantities of polycarboxylic acid anhydrides used are determined by the required acid number.

Examples of suitable polycarboxylic acid anhydrides are maleic acid anhydride, succinic acid anhydride, phthalic acid anhydride, tetrahydrophthalic acid anhydride, hexahydrophthalic acid anhydride, trimellitic acid anhydride, norbornane dicarboxylic acid anhydride, norbornene dicarboxylic acid anhydride and other anhydrides of the type mentioned in reference to the polycarboxylic acids of the pre-condensate.

Resins having the structure of component I, of which the acid number is situated in the upper range indicated, are preferably used for stoving systems, whereas air-drying systems preferably have acid numbers at the lower end of the range indicated.

The urethane-modified polyesters I are water-insoluble, fusible materials which cannot be dispersed in aqueous phase in the quantities indicated without further additives. Furthermore, it is undesirable to modify the polyester I by the incorporation of polyalkylene oxides containing more than three alkylene oxide units per molecule, for example so-called polywaxes, because constituents such as these make the polyester I hydrophilic and this reduces the resistance to water of the coatings to the invention. The components I are preferably completely free from the ether groups.

An important criterion for the usefulness of the urethane-modified polyesters I is that they are fusible. Accordingly, it is undesirable to continue the polycondensation or polyaddition reaction for producing component I at any one of the stages to such an extent that gel-like products or products having elastomeric properties are formed. By contrast, it is not absolutely essential for component I to form clear solutions in standard lacquer solvents such as, for example, xylene or ethyl glycol acetate. It has surprisingly been found that dispersions according to the invention having favourable properties can even be produced from resins only partly soluble in xylene.

If solvents have been used at any of the stages involved in the production of component I, these solvents have to be removed, for example by distillation, at the latest before dispersion.

According to the invention, component I is dispersed in the aqueous phase by means of the emulsifiers IIa and IIb.

Preferred non-ionic emulsifiers (IIa) are ethoxylated, aliphatically substituted aromatic compounds. Thus, polyester dispersions according to the invention having particularly uniform particle sizes are obtained where ethoxylated p-n-nonyl phenol is used. Other preferred emulsifiers (IIa) are obtained by ethoxylating addition products of styrene and its derivatives with phenols, as described for example in German Pat. No. 1,121,814, according to which styrene, α-methyl styrene or vinyl toluene are added with phenol, cresols or xylenols and the reaction products obtained are ethoxylated. In emulsifier mixtures n represents the average value of polyethylene oxide units.

Concerning HLB-values, reference is made to Ulmanns Encyclopadie der Technischen Chemie, 4th Edition, Vol. 10, pages 426–463, Verlag Chemie Weinheim 1975.

Preferred emulsifier resins (IIb) consist of an optionally oil-modified polyester component (hydrophobic) and a polyalkylene oxide component (hydrophilic) containing from 6 to 100 and preferably from 10 to 70 alkylene oxide residues per polyalkylene oxide chain and optionally terminated by alkoxy groups containing from 1 to 4 carbon atoms, the polyalkylene oxide component consisting of several individual polyalkylene oxide chains and the alkylene group containing from 2 to 4, preferably 2, carbon atoms.

The emulsifier resins (IIb) may contain from 0.1 to 10% by weight, based on emulsifier resin (IIb) of urethane groups. In one preferred embodiment, the polyalkylene oxides blocked (for example etherified) at one end are reacted with substantially equimolar quantities of diisocyanate to form polyalkylene oxides containing one free isocyanate group per molecule which may in turn be used for attachment to the polyester component of (IIb).

The average molecular weight of the polyesters preferably used for producing the emulsifier resins (IIb) may be in the range of from 400 to 4000 (as determined by vapour pressure osmometry in acetone).

The polyalkylene oxides used may be homopolyethers and also copolyethers in block or random distribution. Homopolyethylene oxides are particularly preferred starting materials for producing the emulsifier resins (IIb).

In principle, any diisocyanates may be used for attaching the polyester and polyalkylene oxide components.

In general, it is particularly preferred to use the commercially readily obtainable polyisocyanates, for example 2,4- and 2,6-tolylene diisocyanate and mixtures of these isomers ("TDI"), 1,6-hexamethylene diisocyanate, perhydro-2,4'- and/or-4,4'-diphenyl methane diisocyanate and 1-isocyanato-3,3,5-trimethyl-5-isocyanatomethyl cyclohexane.

The type of emulsifier resin (IIb) used and the quantity in which it is used are best selected in such a way that the total content of polyalkylene oxide units in the non-volatile part of the polyester dispersion according to the invention amounts to less than 4% by weight, based on the sum of components I, IIa and IIb.

In one preferred embodiment, the emulsifier resin (IIb) in its non-neutralised form contains carboxyl groups corresponding to an acid number of less than 50 and preferably in the range of from 15 to 35. The emulsifier resin (IIb) may be completely or partly neutralised before it is combined with the aqueous phase III. Preferred neutralising agents are alkali metal hydroxides, ammonia, primary, secondary and tertiary amines such as, for example, ethylamine, diethyl- and triethylamine, mono-, di- and tri-ethanolamine, dimethyl ethanolamine, methyl diethanolamine, and dimethyl aminomethyl propanol. However, neutralisation may also be carried out on introduction into the aqueous phase.

Processes for producing the emulsifier resins (IIb) are known, cf. German Offenlegungsschrifts Nos. 2,528,212 and 2,556,621.

Particularly smooth dispersions are obtained with emulsifier resins (IIb) produced by preparing a polyester having oil contents of from 0 to 30% by weight, an acid number of less than 5 and a hydroxyl number of from 50 to 250 as the hydrophobic component, allowing this polyester to react with the hydrophilic isocyanate components already mentioned until the NCO-groups have completely reacted, subsequently acidifying the reaction product with a dicarboxylic acid anhydride to acid numbers of from 15 to 35 and then neutralising it either by directly introducing an amine into the resin melt or by introducing the resin melt into the aqueous phase containing amine and, optionally, component (IIa). In the last case, the emulsifier resin (IIb) accumulates together with the emulsifier (IIa) in the form of an aqueous solution or dispersion, i.e. in the form of a so-called emulsifier concentrate.

The urethane-modified polyesters I may be dispersed in the aqueous phase by thoroughly stirring the polyesters I together with the substances (IIa) and (IIb) in the melt at 80° to 120° C. and subsequently adding the aqueous phase III to this melt. In general, this process may be carried out in a standard reactor for the production of polyesters. There is generally no need to use high-speed mixers or stirrers. Melt dispersion may, of course, also be carried out by introducing the organic resin phase I and II into the aqueous phase III.

A process which has proved to be particularly favourable from the operational point of view is one in which the substances (IIa) and (IIb) are initially introduced into the aqueous phase III in a stirrer-equipped vessel and the polyester melt I is subsequently added with stirring. Component (IIb) may optionally be introduced in neutralised form.

After all the components I, IIa, IIb and III required for dispersion formation have been combined, the dispersion is generally stirred for between 15 minutes and 5 hours at 50° to 95° C.

Component III contains from 30 to 150% of the quantity of alkali, ammonia or amine sufficient for completely neutralising the carboxyl groups in components (I and IIb). Suitable neutralising agents have already been mentioned in connection with component (IIb). It is preferred to use dimethyl ethanolamine and triethylamine.

For emulsification in the melt, the neutralising agent is best stirred into the melt with part of the water, the rest of the water being added after homogenisation in order to adjust the dispersion to the required solids content, normally between 30 and 50% by weight.

The viscosity of the dispersion formed may be conveniently infuenced through the amount of neutralising agent added. If, for example, polyester I has an acid number of less than 18, neutralisation levels of around 90% for a solids content of around 40% by weight are sufficient to give highly viscous dispersions. Lower levels of neutralisation may appear advisable under these conditions because the guarantee high fluidity of the dispersions for the same solids content. Where the polyester has lower acid numbers, the above-mentioned dependence of viscosity is less pronounced. It is, of course, possible to adjust the required degree of neutralisation and hence the required viscosity in several stages.

The dispersions according to the invention may be combined during or after their preparation with other polymers, for example alkyd resins, polyacrylates, polyurethanes and hard resins, for example colophony or xylene/formaldehyde condensates, i.e. unmodified and modified polymers, of the type described by H. Kittel, Lehrbuch der Lacke und Beschichtungen, Vol. I, Part 1, Verlag W. A. Colomb, Stuttgart-Berlin 1971, pages 122 to 445.

The systems according to the invention are particularly suitable for the production of lacquers, especially stoving lacquers, for which purpose castor oil and soya oil and the corresponding, optionally dehydrated fatty acids have proved to be particularly effective oils. Water-dilutable, crosslinking aminoplast resins, for example melamine resins, may be added to the dispersion according to the invention in quantities of from 10 to 50% by weight and preferably in quantities of from 10 to 30% by weight, based on the mixture of polyester I and melamine resins. These mixtures may be processed to form coatings and thermally hardened immediately after adjustment of the necessary viscosity and, optionally, after the addition of catalysts and auxiliaries.

The dispersions according to the invention may also be used for applications other than stoving lacquers, for example in the production of three-dimensional structures, such as mouldings, gels and the like.

It is possible to add to the dispersions small quantities of standard auxiliaries and additives, for example protective colloids, anti-foam agents, anti-sedimenting agents, anti-frost agents and also viscosity-influencing additives, levelling agents and crosslinking catalysts. However, compatibility should be checked in each case.

In some cases, it is favourable for reasons of better processability and pigment adsorption to adjust the dispersion during production of the lacquer to certain pH values, for example in the range of from 7.5 to 8.5. The neutralising agents already used for neutralisation are generally used for this purpose. Small additions of water-miscible solvents, such as ethanol or butyl glycol, may also be added, although this is generally not necessary. The lacquers produced with the dispersions according to the invention may be applied to the material to be lacquered by standard methods, for example by dip-coating, spray-coating or casting. The necessary viscosity is generlly adjusted by the addition of water.

The lacquer films applied may be hardened at room temperature and at higher temperatures, for example at temperatures in the range of from 60° to 360° C. The high temperature range is preferably used for low-oil and oil-free polyesters I.

The invention is illustrated by the following Examples in which the parts quoted represent parts by weight and the percentages ae percent by weight.

The term "pre-condensates" has the same meaning as in the description. The term "resin" is used for component I.

Emulsifier (IIa)

Ethylene oxide grafted onto nonyl phenol (molar ratio 1:20) with the following properties:
Turbidity point (1% in water): approximately 100° C.
Surface tension (0.1 g/l water): 44.0 dyn/cm
Wetting effect (DIN 53 901): approximately 60 seconds at 60° C.
Mp: approximately 30° C.
HLB-value: 16

Emulsifier (IIb)

400 g of an n-butanol-started polyethylene oxide alcohol having a molecular weight of 2000 are dehydrated in vacuo (15 Torr) for 30 minutes at 120° C. in a two-liter stirrer-equipped vessel provided with an internal thermometer, a dropping funnel and a gas inlet pipe. 2 ml of benzoyl chloride are initially stirred into the melt cooled to 100° C., followed by the addition all at once of 33.6 g of hexamethylene diisocyanate.

After a reaction time of 60 minutes, the isocyanate content of the mixture is determined, amounting to between 1.8 and 1.9% NCO (calculated: 1.94%).

After cooling of the melt, the hydrophilic isocyanate component suitable for further reactions is obtained in the form of a wax-like crystalline substance.

134 g of trimethylol propane and 130.7 g of tetrahydrophthalic acid anhydride are esterified under nitrogen at 220° C. up to an acid number of 4. The viscosity of the preliminary stage obtained corresponded to an outflow time (as measured on a 60% solution in dimethyl formamide in accordance with DIN 53 211, DIN-4-cup) of 170 seconds.

500 g of this preliminary stage are dehydrated in vacuo and subsequently reacted with 88.2 g of the hydrophilic isocyanate component at 100° to 105° C. until no more free isocyanate groups can be detected.

580 g of this product are reacted with 39 g of tetrahydrophthalic acid anhydride at 120° C. to form a polysemiester having an acid number of approximately 27.

26.1 g of dimethyl ethanolamine are carefully added with stirring at 95° to 100° C. to 610 g of this stage.

The resin solidifies on cooling to form a tough, elastic fusible mass.

Pre-condensate A 1313.3 parts of an esterification product of trimethylol propane and a fatty acid mixture containing approximately 50% of conjugated fatty acids in a molar ratio of 1:1, 1294.7 parts of dimethyl terephthalate, and 2426.7 parts of neopentyl glycol were transesterified in the presence of 1.67 parts of tetrabutyl titanate, the methanol formed being separated off during the reaction. After the liberation of methanol had stopped, approximately 1140 parts of excess neopentyl glycol were distilled off in vacuo, and a product having an OH number of approximately 230 was obtained.

Resin A 728.4 parts of pre-condensate A were heated under nitrogen to 110° C., followed by the dropwise addition over a period of 30 minutes at 110° to 114° C. of 151.2 parts of hexamethylene diisocyanate. After a reaction time of 1.5 hours at 120° C., the free NCO content amounted to approximately 0.1%. 870 parts of this product were reacted with 43.6 parts of maleic acid anhydride at 140° C. up to an acid number of approximately 26.

EXAMPLE 1

465 parts of resin A, 20.0 parts of emulsifier (IIb) and 15.0 parts of emulsifier (IIa) are mixed under nitrogen for 15 minutes at 120° C. and the resulting mixture is cooled to 80° C., followed by the dropwise addition over a period of 30 minutes of a mixture of 19.2 parts of dimethyl ethanolamine and 730.8 parts of water, the temperature falling to 50° C. After stirring for another 30 minutes at 50° C., a dispersion having a solids content of approximately 40% is obtained.

100 parts of this dispersion were ground in a bead mill with 35 parts of melamine resin, 6.3 parts of 10% dimethyl ethanolamine, 40 parts of water and 210 parts of TiO$_2$ pigment and the resulting product was made up into a lacquer with 425 parts of the above-mentioned dispersion, 78 parts of melamine resin and 70 parts of water. After ripening for 1 day, the lacquer thus prepared was sprayed onto glass or metal plates and, after airing, was stoved for 30 minutes at 140° C. A high-gloss coating having the following properties was obtained:

| | |
|---|---|
| Layer thickness: | approximately 35μ |
| Gardner gloss 60°: | 94 |
| 20°: | 80 |
| Pencil hardness: | 4 H |
| Pendulum hardness: | 150 seconds |
| Bending test: | good |
| Solvent damage (cootonwool plug 1 minute) | |
| Toluene: | none |
| Ethylene glycol acetate: | none |
| Acetone: | none |
| Resistance to water at room temperature: | 21 days without any effect |

Resin B (1) 1759 parts of a fatty acid mixture containing 50 parts of conjugated fatty acids and 855 parts of trimethylol propane are pre-esterified under nitrogen at 230° C. up to an acid number of approximately 2, after which 1848 parts of this ester are esterified with 1553 parts of isophthalic acid and 1460 parts of neopentyl glycol to form oligoester B1 (acid number 4).

(2) 1275 parts of linear saturated fatty acids (C$_{16}$–C$_{18}$) are esterified in the same way with 675 parts of trimethylol propane, 1660 parts of isophthalic acid and 1560 parts of neopentyl glycol to form oligoester B2 (acid number 4).

EXAMPLE 2

109.6 parts of resin B1 and 107.0 parts of resin B2 are initially introduced into a reaction vessel under nitrogen at 110° C., followed by the dropwise addition with stirring of a mixture of 25.2 parts of hexamethylene-1,6-diisocyanate and 33.3 parts of 1-isocyanato-3,3,5-trimethyl-5-isocyanatomethyl cyclohexane. After a reaction period at 120° C., 22.8 parts of tetrahydrophthalic acid anhydride are added and reacted at 140° C. to form a urethane-modified ester having an acid number of approximately 28.

267 parts of this product, 24 parts of emulsifier IIb and 9 parts of emulsifier IIa are mixed at 120° C. and the resulting mixture is cooled to 90° C., followed by the addition with stirring at 90° to 65° C. of a mixture of 11.9 parts of dimethyl ethanolamine and 438.1 parts of water. A very finely divided storable dispersion having a solids content of approximately 40% is obtained.

Cobalt-Siccative (0.03% of Co-metal, based on solids) was added to the dispersion which was then applied to a glass plate and left to dry in air at room temperature. A dry, clear, solid and resistant lacquer film was obtained after a drying time of 90 minutes.

Pre-condensate C 23.6 parts of 1,6-hexane diol, 62.4 parts of neopentyl glycol, 11.4 parts of 1,2-propane diol, 6.7 parts of trimethylol propane, 51.8 parts of phthalic acid anhydride, 33.2 parts of isophthalic acid and 29.2 parts of adipic acid are esterified under nitrogen at a maximum temperature of 220° C. with elimination of water up to an acid number of approximately 3.

Resin C 31.9 parts of hexamethylene diisocyanate are carefully added with stirring at 110° to 120° C. to 197.6 parts of pre-condensate C and the two components are left to react at 120° C. until no more free NCO can be detected. The product is subsequently acidified with 16.3 parts of tetrahydrophthalic acid anhydride at 140° C. to form the polysemiester. The end product has an acid number of 27.6 to 28.

EXAMPLE 3

267 parts of resin C, 24 parts of emulsifier IIb and 9 parts of emulsifier IIa are melted at 120° C. and the resulting melt is cooled to 90° C., followed by the dropwise addition of a mixture of 11.7 parts of dimethyl ethanolamine and 438.3 parts of water. The product is stirred for 30 minutes at 60° C. and slowly cooled. The dispersion formed is homogeneous and finely divided and has a solids content of approximately 40%.

50 parts of this dispersion, 17.5 parts of melamine resin, 3.1 parts of dimethyl ethanolamine, 20 parts of water and 105 parts of TiO$_2$ pigment are ground in a bead mill. The ground material is made up into a lacquer with 212.5 parts of the dispersion of Example 3 and 39 parts of melamine resin and the lacquer thus formed is diluted with water to a viscosity suitable for spraying. After ripening, the lacquer is sprayed onto a test plate and, after airing, is stoved for 30 minutes at 120° C. A high-gloss elastic coating having the following properties is obtained:

| Layer thickness: | 35–40μ |
|---|---|
| Gardner gloss 60°: | 95 |
| 20°: | 86 |
| Lattice cut: | 1 |
| Mandrel bending test ASTM-D-522-60: | 32% |
| Erichsen elongation (DIN 53 156): | 10 |
| Impact elasticity ASTM-D-2794 direct: | 82 |
| indirect: | 82 |

We claim:

1. An aqueous dispersion of a urethane-modified polyester characterized in that it comprises:
   (I) from 25 to 60% by weight of a urethane-modified oligoester and/or polyester of the alkyd type having a molecular weight of less than 5,000 and an acid number of 10 to 40 and containing less than 1% by weight, based on (I) of urea groups, (I) being obtainable by reacting a urethane-modified oligoester and/or polyester having an acid number of less than 10 and an OH-number of from 30 to 500 with a dicarboxylic acid anhydride and/or a tricarboxylic acid anhydride;
   (IIa) from 0.02 to 4% by weight of at least one nonionic emulsifier having a calculated HLB-value of from 10 to 20;
   (IIb) from 0.02 to 4% by weight of at least one polyether-modified polyester emulsifier resin which contains from 10 to 50% by weight of co-condensed polyalkylene glycol residues and
   (III) from 32 to 75% by weight of aqueous phase containing from 30 to 150% by weight of the quantity of alkali, ammonia or amine sufficient for completely neutralizing the carboxyl groups of polyesters (I) and (IIb).

2. The dispersion as claimed in claim 1 wherein (I) has a molecular weight of less than 4,000.

3. The dispersion as claimed in claim 1 wherein (I) has an OH-number of from 50 to 280.

4. The aqueous dispersion as claimed in claim 1 wherein (IIa) corresponds to the formula

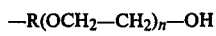

wherein
R is alkyl having from 12 to 30 carbon atoms or

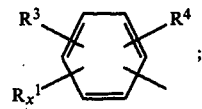

$R^1$ is alkyl having from 4 to 20 carbon atoms or

$R^2$ is hydrogen, methyl or phenyl;
$R^3$ is methyl, phenyl or hydrogen;
$R^4$ is methyl or hydrogen;
n is a number of from 10 to 40 and
x is a number of from 1 to 3.5

5. The aqueous dispersion as claimed in claim 4 wherein n is a number of from 15 to 25 and x is a number of from 1 to 3.

6. The aqueous dispersion as claimed in claim 1 wherein (IIb) contains from 10 to 20% by weight, of co-condensed polyalkylene glycol residues.

7. The aqueous dispersion as claimed in claim 1 wherein the co-condensed polyalkylene glycol residue of (IIb) is attached to the polyester emulsifier resin molecule through urethane groups.

8. A process for producing the dispersion claimed in claim 1 which comprises dispersing (I) and (III) in the presence of (IIa) or (IIb).

* * * * *